Sept. 4, 1956 H. SOLEM 2,761,226
COMBINED ROAD LEVELLING AND BRAKING MEANS FOR USE IN CONNECTION WITH LOGGING SLEDS AND THE LIKE
Filed March 9, 1953 2 Sheets-Sheet 1
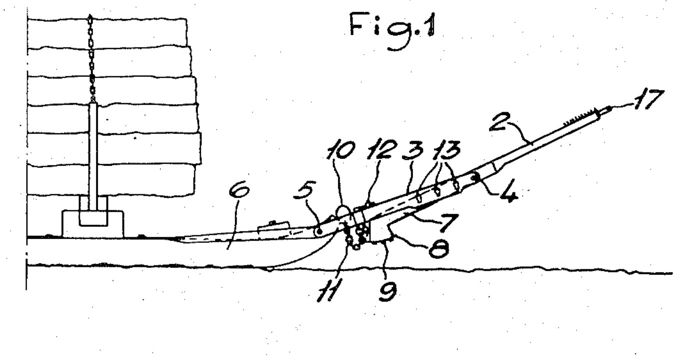
Fig.1
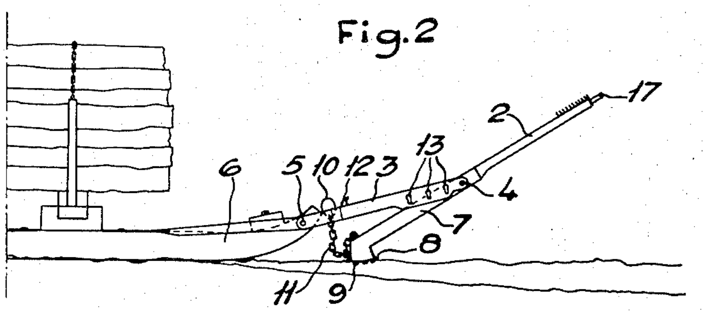
Fig.2
Fig.3
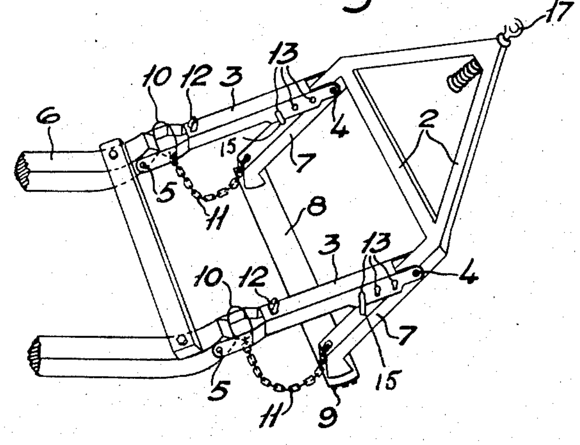
Inventor
Hans Solem
By Pierce, Scheffler & Parker
Attorneys Sept. 4, 1956 H. SOLEM 2,761,226

COMBINED ROAD LEVELLING AND BRAKING MEANS FOR USE IN CONNECTION WITH LOGGING SLEDS AND THE LIKE

Filed March 9, 1953 2 Sheets-Sheet 2

Inventor
Hans Solem
By Pierce, Scheffler & Parker
Attorneys 2,761,226
Patented Sept. 4, 1956

2,761,226

COMBINED ROAD LEVELLING AND BRAKING MEANS FOR USE IN CONNECTION WITH LOGGING SLEDS AND THE LIKE

Hans Solem, Lycksele, Sweden, assignor to Holmsunds Aktiebolag, Holmsund, Sweden Application March 9, 1953, Serial No. 341,110

Claims priority, application Sweden March 11, 1952

3 Claims. (Cl. 37—10)

In logging districts where—open on hilly ground—main haulage roads and other rods are built to the logging areas the road maintenance in winter is a great problem. It is expensive as well as time-consuming to build the roads and to keep them in a condition in which they are safe and easy for logging sleds and the like.

The present invention relates to means serving to facilitate in winter the driving of logging sleds and the like on main haulage roads and other rods, even if the roads are steep and not in a particularly good condition.

The invention resides in combined road levelling and braking means for use in connection with logging sleds and the like, said means comprising a member adapted to be swingably and/or turnably applied between means for moving the sled or between successive sleds in a series of sleds.

The word "levelling" in the present connection is meant to include smoothening the road surface, packing snow and ice and hardening the road surface resulting therefrom.

The substantial characteristic of the invention consists in that the said swingable and/or turnable member which, with an element mounted thereon and provided with levelling and braking means, is adapted normally to be held pressed against the road surface with a pressure sufficient to provide for the required levelling of the road surface and also on one hand, under the influence of a force added to the normal sled moving force and tending to impart to the sled an accelerated motion, for example, when the sled is moving downhill, to be pressed with the said element so forcibly against the road surface that in addition to the levelling of the road surface also braking of the sled is obtained, and on the other hand, under the influence of a force counteracting the normal sled moving force and tending to impart to the sled a retarded motion, for example, when the sled is moving uphill, to be swung out of engagement with the road surface.

Preferably, the member provided with levelling and braking means is shaped as a frame-like portion, which is swingably mounted in two arms, said arms being adapted to be connected to a following sled—when seen in the direction of forward motion of the sled—said frame-like portion, for example, by means of a loop or similar connecting member provided at the fore end of the frame, being adapted to be swingably and/or turnably connected to the sled moving means and, respectively, to the sled next ahead in a series of sleds.

The frame-like portion and the arms adapted to be connected to a sled next behind are adapted to be set to various angular positions relatively to each other so as to provide for the desired adjustment of the contact pressure of the levelling and braking means against the road surface.

Furthermore, the frame-like portion may be provided with means so that when required it may, by means of locking members, be fastened to the arms, adapted to be connected to the sled, in a position that will not enable the frame-like portion to exert either any levelling or any breaking action.

The levelling and braking means preferably consist of a plank or the like provided with braking fillets or the like, said plank extending transversely of the direction of motion of the frame-like portion and being mounted at the rear part of said frame-like portion.

Consequently, by means of a device according to the invention automatic levelling and hardening of the road surface are obtained, also automatic braking of logging sleds during transportation on roads having steep downward slopes, the road surface being then simultaneously smoothed and hardened along the braking distance, and finally also a stabilization of the movements of all the sleds in a series of sleds, resulting in a smooth and safe run of the sleds.

The accompanying drawings illustrate one way of embodying a device in accordance with the invention.

Figures 1 and 2 show the device in side view, when connected to a logging sled, the device being shown in Figure 1 when in inoperative position and in Figure 2 when in operative position.

Figure 3 is a perspective view of the device when in operative position.

Figure 4:
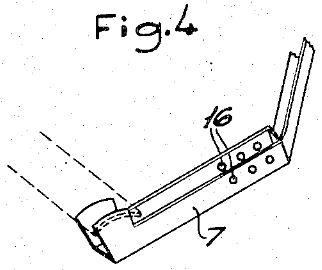
Figures 4–8 show details.
Figure 6:
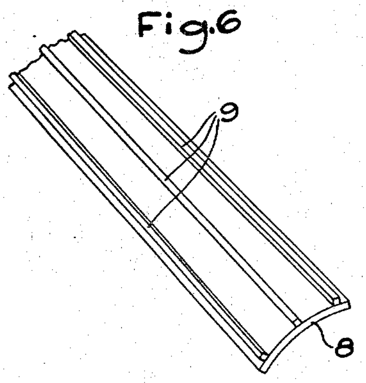
Figure 5:
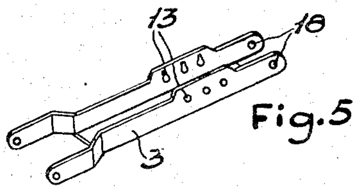
Figure 7:
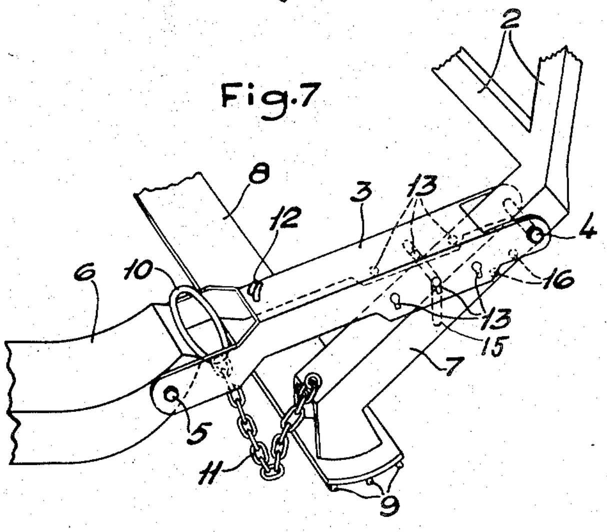
Figure 8:
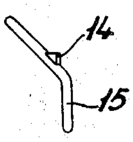

Referring to the drawings numeral 2 indicates a frame-like portion having a triangular contour, said portion being by means of arms 3 and bolts 4, 5 connected to the fore ends of the runners of a sled 6 in such a manner that it is vertically swingable on the said bolts. At the ends of two extensions 7, which—when seen in the direction of forward motion—extend backwards from the frame-like portion 2, said portion is provided with a traversing levelling member 8, interconnecting the ends of the said extensions. During normal run of the sled the levelling member 8 is adapted to rest against the road surface with such a pressure that the required smoothening and hardening of the road surface is obtained. The levelling member 8 is provided with friction members 9 adapted, when the levelling member 8 is, with a force exceeding the normal force, pressed against the road surface to engage with the latter and exert a braking action on the sled. The friction members 9 may, for example, consist of fillets extending longitudinally of the levelling member 8. This is illustrated particularly in Figure 6, showing part of the levelling member when viewed from below. At the end of each extension 7 there is secured a chain 11 having a handle 10 for the purpose of making it possible to raise the levelling member 8 manually from the road surface when desired. The chains may be hooked to engaging members 12 provided on the arms 3. As already mentioned the extensions 7 and the arms 3 may be locked to each other in various angular positions so as to provide for such adjustment of the contact pressure of the levelling member 8 on the road surface as will cause the contact pressure to become the most suitable one with respect to prevailing conditions (weather, quantity of snow, state of the road surface). For that purpose there are provided holes 13 (Figure 5) in the arms 3 through which a wedge 15 (Figure 8) is meant to be introduced, said wedge being provided with a catch 14. Furthermore, the extensions 7 are provided with holes 16 (Figure 4) and the arms 3 are provided with holes 18 (Figure 5) so as to make it possible by means of the bolts 4 to set the extensions 7 and the arms 3 longitudinally to various positions relatively to each other. At its fore end, when seen in the direction of forward motion, the frame-like portion 2 is provided with a loop 17 for connecting the frame to the force of motion (a tractor et cetera).

The mode of operation is as follows:

During normal run of the sled (or sleds) the levelling member 8 with a suitable pressure contacts the road surface, an effective levelling of the road surface being then obtained, i. e. snow and ice on the road being packed, the road surface being smoothed and hardened. This is indicated in Figure 2.

Upon increased friction between the runners of the sled 6 and the road surface, or when the sled is moving uphill, the levelling member 8, however, when the sled is moving forward will—due to its being mounted to swing vertically on the bolts 4 and 5 and due to its being, by means of the loop 17, jointedly and swingably connected to the forwardly moving means—automatically be held raised from the road surface.

When the sled is moving downhill and, due to the gravity, is tending to get an eccelerated motion in the direction of transportation and also tending to exert too heavy a pressure on the moving unit (tractor etc.), ahead of the sled, the levelling member 8 is swung automatically downwards and, with the braking means 9 provided thereon, is pressed more forcibly against the road surface, the sled being braked and a simultaneous, effective levelling of the road surface being obtained along the braking distance.

If it is desired to move the sled backwards the levelling member 8 may, as previously indicated, be raised from the road surface by hand and be kept in the raised position.

However, the actual levelling of the road surface is meant to take place substantially when the sleds are moved to the places where the logs are to be collected.

A device according to the invention eliminates the drawbacks connected with the use of sand, sawdust, charcoal-breeze and the like for braking, such as damage to the road surface due to thawing where such materials are deposited. The use of the new device makes the roads stronger than otherwise and also makes them usable for a longer space of time. The ploughing of roads, treated with the new device, can be done more rapidly and effectively. On hilly and curving roads the device operates smoothly and safely, the number of accidents being thereby materially reduced. Finally, the device offers the possibility of making a freer choice of where to build the roads and how to construct them.

Having now described my invention, what I claim as new and desire to secure by Letters Patent is:

1. In combination a pair of spaced apart parallel, similar, abreast sled runners, a link member vertically swingably connected at its rear end to the front end of each of said sled runners, said link members being of substantially equal lengths, an arm vertically swingably connected at a point adjacent to its front end to the front end of each of said link members, said arms being of substantially equal lengths and extending rearwardly under said link members, a draft member rigidly connected at its rear end to the front ends of said arms, said draft member extending forwardly a substantial distance from its connection with said arms, a road levelling and braking member connected between the rear ends of said arms and adjustable means for limiting the swinging movement of said arms with respect to said link members.

2. In combination a pair of spaced apart parallel, similar, abreast sled runners, a link member vertically swingably connected at its rear end to the front end of each of said sled runners, said link members being of substantially equal lengths, an arm vertically swingably connected at a point adjacent to its front end to the front end of each of said link members, said arms being of substantially equal lengths and extending rearwardly under said link members, a draft member rigidly connected at its rear end to the front ends of said arms, said draft member extending forwardly a substantial distance from its connection with said arms, said link members having spaced apart parallel side walls, and said arms being of a size capable of entering between said walls, a series of openings in said walls and key members adapted to be positioned in said openings to limit the swinging movement of said arms into the space between said walls.

3. In the combination defined in claim 2, means for securing the rear ends of said arms to the rear ends of said link members.

References Cited in the file of this patent

UNITED STATES PATENTS

| | | |
|---|---|---|
| 183,667 | Hanson | Oct. 24, 1876 |
| 408,853 | Robertson | Aug. 13, 1889 |
| 600,749 | St. Louis | Mar. 15, 1898 |
| 937,561 | Alexander et al. | Oct. 19, 1909 |
| 1,043,022 | McIntire | Oct. 29, 1912 |
| 1,428,880 | DeMott | Sept. 12, 1922 |
| 1,509,761 | Legault | Sept. 23, 1924 |

FOREIGN PATENTS

| | | |
|---|---|---|
| 70,084 | Norway | Feb. 18, 1946 |